(12) United States Patent
Thomas et al.

(10) Patent No.: US 9,587,840 B2
(45) Date of Patent: Mar. 7, 2017

(54) ECONOMIZER TARGET TEMPERATURE SHIFT DURING MECHANICAL COOLING

(71) Applicant: Lennox Industries Inc., Richardson, TX (US)

(72) Inventors: Herman Marcus Thomas, Garland, TX (US); Marcus W. Troxell, Frisco, TX (US); Stephen A. Walter, Flower Mound, TX (US)

(73) Assignee: Lennox Industries Inc., Richardson, TX (US)

( * ) Notice: Subject to any disclaimer, the term of this patent is extended or adjusted under 35 U.S.C. 154(b) by 263 days.

(21) Appl. No.: 14/165,069

(22) Filed: Jan. 27, 2014

(65) Prior Publication Data

US 2015/0211777 A1    Jul. 30, 2015

(51) Int. Cl.
| F25B 49/00 | (2006.01) |
| F24F 1/00 | (2011.01) |
| F25B 40/00 | (2006.01) |
| F24F 11/00 | (2006.01) |
| F25B 49/02 | (2006.01) |

(52) U.S. Cl.
CPC ........ *F24F 1/0007* (2013.01); *F24F 11/0001* (2013.01); *F24F 11/0012* (2013.01); *F25B 40/00* (2013.01); *F24F 2001/0051* (2013.01); *F24F 2011/0002* (2013.01); *F24F 2011/0006* (2013.01); *F24F 2011/0013* (2013.01); *F24F 2011/0046* (2013.01); *F24F 2011/0056* (2013.01); *F25B 49/022* (2013.01); *Y02B 30/542* (2013.01)

(58) Field of Classification Search
CPC ....... F24F 2001/0051; F24F 2011/0002; F24F 2011/0046; F24F 11/0001; F24F 11/0012; F25B 49/022; F25B 40/00
See application file for complete search history.

(56) References Cited

U.S. PATENT DOCUMENTS

| 2005/0087616 | A1* | 4/2005 | Attridge .................. F24F 3/044 236/91 D |
| 2010/0070082 | A1* | 3/2010 | Chessel ................ F24F 11/0079 700/275 |
| 2011/0197601 | A1* | 8/2011 | Booth .................... F24F 11/008 62/89 |

(Continued)

*Primary Examiner* — Jianying Atkisson
*Assistant Examiner* — David Teitelbaum
(74) *Attorney, Agent, or Firm* — Winstead PC

(57) ABSTRACT

A method and apparatus for cooling a supply of air is provided. A unit controller receives a cooling demand signal. In response to the cooling demand signal, the unit controller adjusts an economizer according to an economizing function. The economizing function is configured to achieve an initial free cooling target temperature as a discharge air temperature. The unit controller receives an additional cooling demand signal. In response to the additional cooling demand signal, the unit controller reduces the free cooling target temperature. The unit controller adjusts the economizer according to the economizing function, with the economizing function configured to achieve the reduced free cooling target temperature as the discharge air temperature. Additionally in response to the additional cooling demand signal, the unit controller signals a unit to perform mechanical cooling on a supply of air received from the economizer.

12 Claims, 2 Drawing Sheets

(56) References Cited

U.S. PATENT DOCUMENTS

| | | | | |
|---|---|---|---|---|
| 2012/0103591 A1* | 5/2012 | Tozer | ............... | F25D 16/00 |
| | | | | 165/281 |
| 2012/0318007 A1* | 12/2012 | Lukasse | ............ | F25B 49/02 |
| | | | | 62/89 |
| 2014/0033753 A1* | 2/2014 | Lu | ............... | F25B 49/02 |
| | | | | 62/190 |
| 2014/0053588 A1* | 2/2014 | Karrat | ............ | H05K 7/20836 |
| | | | | 62/203 |

* cited by examiner

US 9,587,840 B2

ECONOMIZER TARGET TEMPERATURE SHIFT DURING MECHANICAL COOLING

TECHNICAL FIELD

This application relates to HVAC controllers and, more particularly, to control of HVAC economizers.

BACKGROUND

One function of a Heating, Ventilation, and Air Conditioning (HVAC) unit is providing conditioned air to cool an enclosed space, usually a building. During this conditioning, a volume of air is drawn into the HVAC unit, conditioned, and discharged into the building. Typical HVAC units can perform both free cooling and mechanical cooling. Free cooling utilizes the cooler outdoor air as some or all of the air volume. Mechanical cooling is the use of mechanical components to reduce the temperature of the air volume.

An evaporator coil is a conventional component in mechanical cooling. The evaporator coil contains a refrigerant. A blower moves air past the evaporator coil, transferring heat from the air to the evaporator coil. During mechanical cooling, the air volume received by the evaporator coil can be called the "supply air" for mechanical cooling.

Free cooling is preferable to mechanical cooling because free cooling uses substantially less energy. During free cooling, the HVAC unit controller performs an economizing function. The economizing function attempts to make the temperature of the air discharged from the HVAC unit (the "discharge air temperature") equal to a target temperature (the "free cooling target temperature"). The economizing function increases or decreases the amount of outdoor air drawn into the HVAC unit as necessary to achieve the free cooling target temperature.

Free cooling alone may not be enough to satisfy the cooling demands of a building. If this is the case, the HVAC unit can perform free cooling and mechanical cooling together. However, combining free cooling and mechanical cooling creates difficulties with the amount of outdoor air that should be used as the supply air.

Some HVAC unit controllers continue the economizing function when free cooling and mechanical cooling are combined. In practice, these unit controllers do not receive the benefits of the free cooling. Mechanical cooling tends to quickly reduce the discharge air temperature below the free cooling target temperature. As a result, the economizing function stops utilizing any outdoor air, and the HVAC unit effectively uses only mechanical cooling.

Other HVAC unit controllers instead utilize only outdoor air as the supply air when combining free cooling and mechanical cooling. These unit controllers can produce undesirably cold discharge air. For example, the outdoor air may be 50 degrees Fahrenheit, but the discharge air may be below 32 degrees Fahrenheit after being cooled by the evaporator coil. The resulting air delivered from the HVAC unit may be uncomfortable for the occupants of the building because it is too cold.

This undesirably cold air may also create conditions where the evaporator coil freezes. The cold refrigerant inside the coil can chill the outside surfaces of the coil to below the freezing point of the moisture content of the air. The moisture droplets in the air passing over the evaporator coil may then freeze onto the coil. The ice formation blocks off air flow paths through the coil, resulting in reduced air flow into the building. The frozen evaporator coil may cause the air delivered from the HVAC unit to be uncomfortably humid in addition to being uncomfortably cold.

It would be desirable if an HVAC unit could effectively utilize free cooling and mechanical cooling simultaneously without the risk of undesirably cold discharge air. In particular, the evaporator coil should preferably not cool the discharge air below the freezing point of water.

SUMMARY

In an embodiment, a method of cooling a supply of air is provided. A unit controller receives a cooling demand signal. In response to the cooling demand signal, the unit controller adjusts an economizer according to an economizing function. The economizing function is configured to achieve an initial free cooling target temperature as a discharge air temperature. The unit controller receives an additional cooling demand signal. In response to the additional cooling demand signal, the unit controller reduces the free cooling target temperature. The unit controller adjusts the economizer according to the economizing function, with the economizing function configured to achieve the reduced free cooling target temperature as the discharge air temperature. Additionally in response to the additional cooling demand signal, the unit controller signals a unit to perform mechanical cooling on a supply of air received from the economizer.

DESCRIPTION OF DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough explanation. However, such specific details are not essential. In other instances, well-known elements have been illustrated in schematic or block diagram form. Additionally, for the most part, specific details within the understanding of persons of ordinary skill in the relevant art have been omitted.

Figure 1:
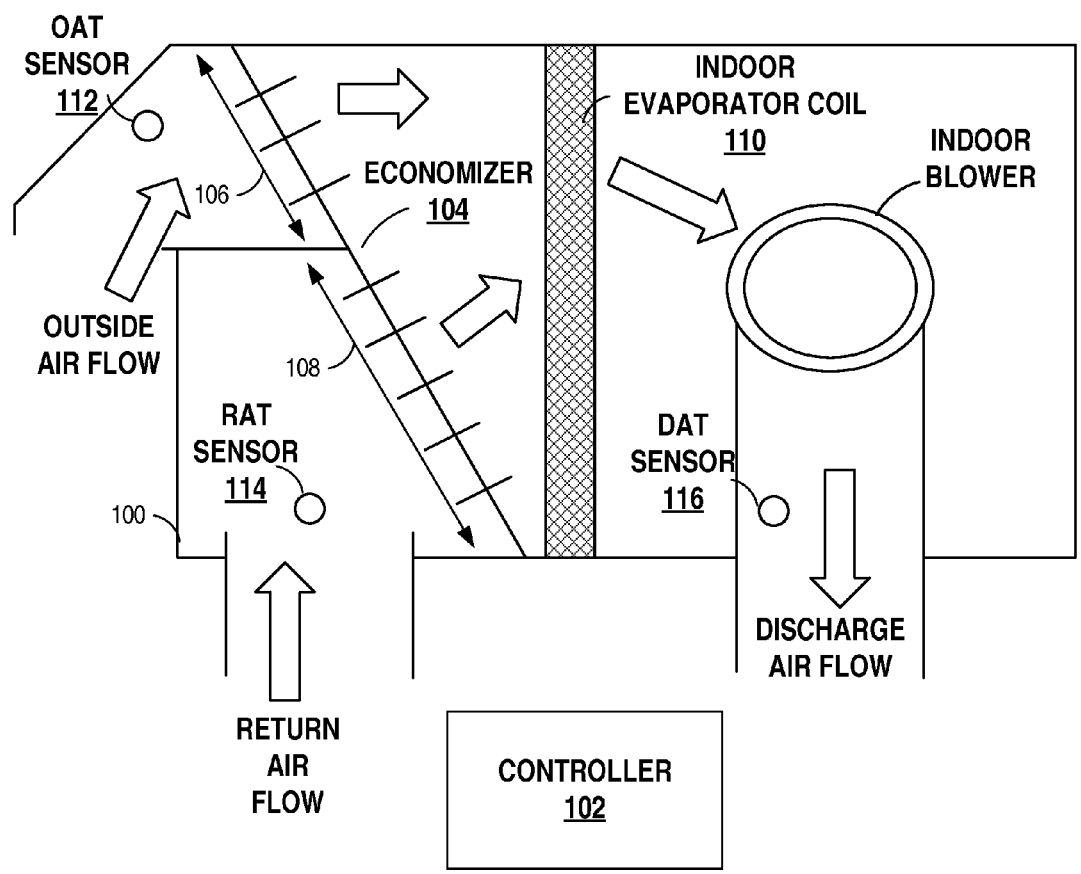
FIG. 1 depicts an HVAC unit and an HVAC controller which may benefit from an exemplary embodiment of the present invention.

With reference to FIG. 1, depicted are a Heating, Ventilation, and Air Conditioning (HVAC) unit 100 and a controller 102. Unit 100 contains mechanical components which, among other things, can cool air flowing through the unit. This air in turn cools a building. Unit 100 can also sense air temperatures related to cooling the building. Generally speaking, a building thermostat or building energy management system informs controller 102 on the cooling needs of the building, and controller 102 instructs unit 100 on how to respond to those cooling needs. Unit 100 may be referred to as a Roof-Top Unit (RTU). However, unit 100 is not necessarily located on a rooftop.

Unit 100 has economizer 104. Economizer 104 comprises outdoor air damper 106 and return air damper 108. Outdoor air damper 106 can receive air from outside the building ("outside air flow"), and return air damper 108 can receive air returned from inside the building ("return air flow"). Outdoor air damper 106 and return air damper 108 may each be opened, to receive air from their respective sources, or closed, to keep out air from their respective sources.

Unit 100 also has indoor evaporator coil 110. During mechanical cooling, the refrigerant in indoor evaporator coil 110 absorbs heat from the air flow as is known in the art. The combination of air from outdoor air damper 106, if any, and return air damper 108, if any, forms the air for mechanical cooling.

Unit 100 has outdoor air temperature (OAT) sensor 112, return air temperature (RAT) sensor 114, and discharge air temperature (DAT) sensor 116. OAT sensor 112 measures the temperature of the outdoor air, RAT sensor 114 measures the temperature of the return air, and DAT sensor 116 measures the temperature of the discharge air. Controller 102 receives the temperatures measured by sensors 112, 114, and 116.

Free cooling is available when the outdoor air temperature, measured by OAT sensor 112, is at or below a user-adjustable temperature. During free cooling, controller 102 performs an economizing function. The economizing function adjusts economizer 104 to achieve the free cooling target temperature as the discharge air temperature. The free cooling target temperature may be 55 degrees Fahrenheit.

By adjusting economizer 104, controller 102 can change the relative amounts of cooler outdoor air and warmer return air that pass through HVAC unit 100. When the discharge air temperature is at or above the free cooling target temperature, controller 102 opens outdoor air damper 106 fully and closes return air damper 108 fully in an attempt to lower the discharge air temperature. When the discharge air temperature is below the free cooling target temperature, controller 102 gradually closes outdoor air damper 106 and gradually opens return air damper 108 in an attempt to raise the discharge air temperature.

Figure 2:
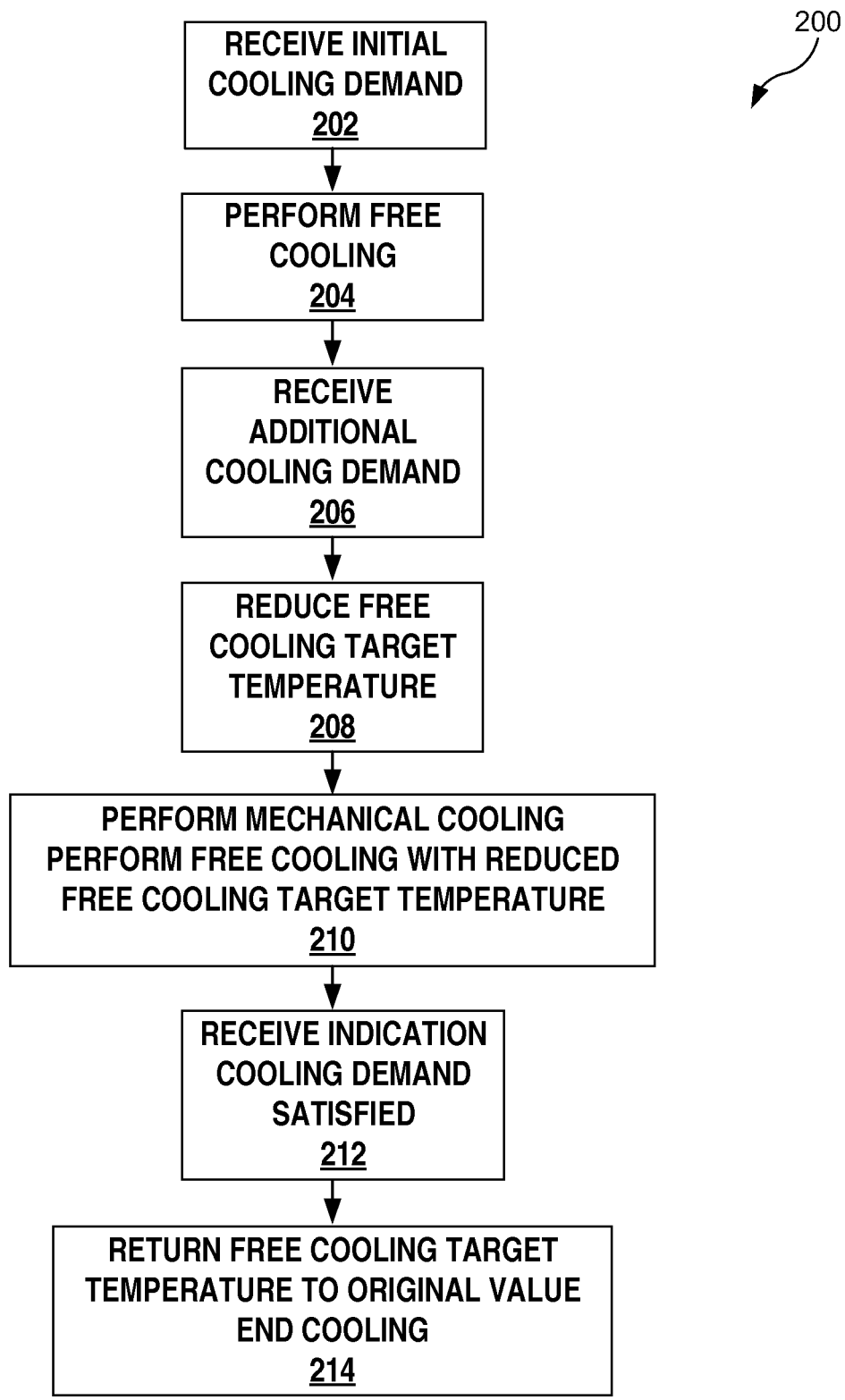
FIG. 2 depicts a method that an HVAC controller may perform to avoid the problem of undesirably cold discharge air when utilizing outdoor air as supply air.

As previously discussed, some conventional controllers continue the economizing function during both free and mechanical cooling. In practice, these controllers tend to experience the discharge air temperature dropping below the free cooling target temperature due to the mechanical cooling. These controllers would then close outside air damper 106 in an attempt to warm the discharge air up to the free cooling target temperature. Other controllers would fully open outside air damper 106 during the mechanical cooling, which risks the problem of undesirably cold discharge air. With reference to FIG. 2, depicted is a method 200 that controller 102 may perform to avoid the problem of undesirably cold discharge air when utilizing outdoor air as supply air. At 202, controller 102 receives an initial cooling demand when the outdoor air is suitable for free cooling. This cooling demand may be a signal may be sent from a thermostat or building energy management system. At 204, controller 102 responds to the cooling demand with free cooling. Controller 102 performs the economizing function, adjusting economizer 104 as necessary to maintain the discharge air temperature, as measured by discharge air temperature sensor 116, at the free cooling target temperature.

At 206, controller 102 receives an additional cooling demand, which again may be a signal sent from the thermostat or energy management system. This additional cooling demand indicates free cooling is insufficient to cool the building. At 208, this combination of the additional cooling demand and the availability of free cooling causes controller 102 to reduce the free cooling target temperature to a second, reduced free cooling target temperature. 208 may occur simultaneously with 210.

The reduced free cooling target temperature is lower than the original free cooling target temperature. The reduced free cooling target temperature may be 45 degrees Fahrenheit, but other temperatures may be used. A reduced free cooling target temperature lower than 45 degrees Fahrenheit may be suitable, although a reduced free cooling target temperature which is too low can cause an evaporator coil freezing issue.

At 210, controller 102 signals unit 100 to perform mechanical cooling. Controller 102 may send a signal or signals to unit 100 that instructs unit 100 to perform mechanical cooling. Unit 100 also continues to perform free cooling, but the economizing function now attempts to maintain the discharge air temperature at the reduced free cooling target temperature. Due to the reduced free cooling target temperature, controller 102 gradually closes outdoor air damper 106 and gradually opens return air damper 108 when the discharge air temperature is below the new reduced free cooling target temperature, not the original free cooling target temperature. When the discharge air temperature is at or above the reduced free cooling target temperature, controller 102 opens outdoor air damper 106 gradually and closes return air damper 108 gradually in an attempt to lower the discharge air temperature.

At 212, controller 102 receives an indication the cooling demand at 206 has been satisfied. This indication may be the removal of a signal representing the cooling demand received at 206. A thermostat or building energy management system may remove the signal. For example, a home thermostat stops the cooling demand signal when the temperature measured by the thermostat reaches a programmed set-point. Typically, the cooling demand at 202 is satisfied, and a signal representing it removed, at the same time the cooling demand at 206 is satisfied.

At 214, in response to the indication at 212, controller 102 returns the free cooling target temperature to its original value. If the cooling demands at 202 and 206 have both been met, controller 102 may also end free and mechanical cooling. Method 200 may begin again at 202 when controller 102 receives another cooling demand.

In method 200, the reduced free cooling target temperature prevents the discharge air from becoming undesirably cold. The economizing function also continues to utilize outdoor air, conserving energy. Outdoor air damper 106 can remain fully open until the discharge air temperature falls below the reduced free cooling target temperature, rather than the higher original free cooling target temperature.

It is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments.

We claim:

1. A method of cooling a supply of air, the method comprising:
   an HVAC unit controller receiving a cooling demand signal;
   in response to the cooling demand signal, the unit controller adjusting an economizer according to an economizing function, the economizing function configured to achieve an initial free cooling target temperature as a discharge air temperature;

the unit controller receiving an additional cooling demand signal; and in response to the additional cooling demand signal:
the unit controller reducing the initial free cooling target temperature to achieve a subsequent free cooling target temperature;
the unit controller adjusting the economizer according to the economizing function, the economizing function configured to achieve the subsequent free cooling target temperature as the discharge air temperature; and
the unit controller signaling a unit to simultaneously perform mechanical cooling on a supply of air received from the economizer while adjusting the economizer according to the economizing function, the economizing function configured to achieve the subsequent free cooling target temperature as the discharge air temperature by increasing or decreasing an amount of outdoor air drawn into the unit as necessary.

2. The method of claim 1, wherein the initial free cooling target temperature is 55 degrees Fahrenheit and the subsequent free cooling target temperature is 45 degrees Fahrenheit.

3. The method of claim 1, wherein the subsequent free cooling target temperature is less than or equal to 45 degrees Fahrenheit.

4. The method of claim 1, further comprising:
the unit controller receiving an indication that the additional cooling demand has been met; and
the unit controller returning the subsequent free cooling target temperature to the initial free cooling target temperature.

5. The method of claim 4, wherein the indication that the additional cooling demand has been met comprises the removal of the additional cooling demand signal.

6. The method of claim 1, wherein the mechanical cooling comprises moving the supply of air past an evaporator coil.

7. An HVAC unit controller configured to cool a supply of air, the controller to perform a method comprising:
receiving a cooling demand signal;
in response to the cooling demand signal, adjusting an economizer according to an economizing function, the economizing function configured to achieve an initial free cooling target temperature as a discharge air temperature;
receiving an additional cooling demand signal; and
in response to the additional cooling demand signal:
reducing the initial free cooling target temperature to achieve a subsequent free cooling target temperature;
adjusting the economizer according to the economizing function, the economizing function configured to achieve the subsequent free cooling target temperature as the discharge air temperature; and
signaling a unit to simultaneously perform mechanical cooling on a supply of air received from the economizer while adjusting the economizer according to the economizing function, the economizing function configured to achieve the subsequent free cooling target temperature as the discharge air temperature by increasing or decreasing an amount of outdoor air drawn into the unit as necessary.

8. The HVAC unit controller of claim 7, wherein the initial free cooling target temperature is 55 degrees Fahrenheit and the subsequent free cooling target temperature is 45 degrees Fahrenheit.

9. The HVAC unit controller of claim 7, wherein the subsequent free cooling target temperature is less than or equal to 45 degrees Fahrenheit.

10. The HVAC unit controller of claim 7, wherein the method further comprises:
receiving an indication the additional cooling demand has been met; and
returning the subsequent free cooling target temperature to the initial free target temperature.

11. The method of claim 10, wherein the indication the additional cooling demand has been met comprises the removal of the additional cooling demand signal.

12. The HVAC unit controller of claim 7, wherein the mechanical cooling comprises moving the supply of air past an evaporator coil.

* * * * *